United States Patent [19]

Okamoto et al.

[11] Patent Number: 4,590,524

[45] Date of Patent: May 20, 1986

[54] MULTITRACK PCM REPRODUCING APPARATUS

[75] Inventors: Hiroo Okamoto; Masaharu Kobayashi, both of Yokohama; Takashi Hoshino, Fujisawa; Masami Nishida, Yokohama, all of Japan

[73] Assignee: Hitachi, Ltd., Tokyo, Japan

[21] Appl. No.: 553,234

[22] Filed: Nov. 18, 1983

[30] Foreign Application Priority Data

Nov. 19, 1982 [JP] Japan .............57-201917
May 13, 1983 [JP] Japan ..............58-82672

[51] Int. Cl.⁴ ........................ G11B 15/14; G11B 5/00
[52] U.S. Cl. ......................................... 360/65; 360/32
[58] Field of Search ...................... 360/32, 46, 65, 64

[56] References Cited

U.S. PATENT DOCUMENTS

3,340,367 9/1967 Coleman, Jr. et al. ............... 360/65
3,499,997 3/1970 Kosugi et al. ......................... 360/64
3,949,419 4/1976 Mashida ............................... 360/64
4,152,733 5/1977 Melwisch ............................. 360/65
4,443,822 4/1984 Furtner ................................. 360/65

*Primary Examiner*—Vincent P. Canney
*Attorney, Agent, or Firm*—Antonelli, Terry & Wands

[57] ABSTRACT

A multitrack PCM reproducing apparatus for reproducing PCM signals recorded on a plurality of tracks in a distributed relation, comprises a signal selector circuit sequentially selecting the PCM signals reproduced from the individual tracks, an A/D converter converting the reproduced signals selected by the signal selector circuit into digital signals, a memory circuit storing the digital signals obtained by the A/D conversion, a single digital filter equalizing for each track the waveform of the digital signals stored in the memory circuit, and a signal processor circuit demodulating the PCM signals on the basis of the digital signals processed by the digital filter.

7 Claims, 20 Drawing Figures

MULTITRACK PCM REPRODUCING APPARATUS

BACKGROUND OF THE INVENTION

1. Field of the Invention

This invention relates to a multitrack PCM reproducing apparatus including a reproduced waveform equalizer circuit suitable for integration into an IC.

2. Description of The Prior Art

In the recording onto and reproduction of a digital signal from a magnetic tape, the waveform of the reproduced signal tends to differ or deviate from that of the digital signal being recorded or already recorded on the magnetic tape depending on the transmission characteristics of the magnetic tape and magnetic heads which results in inaccurate transmission of the signal. Especially, in the case of high-density magnetic recording in which an audio signal is recorded on a magnetic tape in a compact cassette with a PCM format, deterioration of the waveform of the reproduced signal is substantial, and it is necessary to apply waveform equalization to the reproduced signal waveform.

Figure 1:
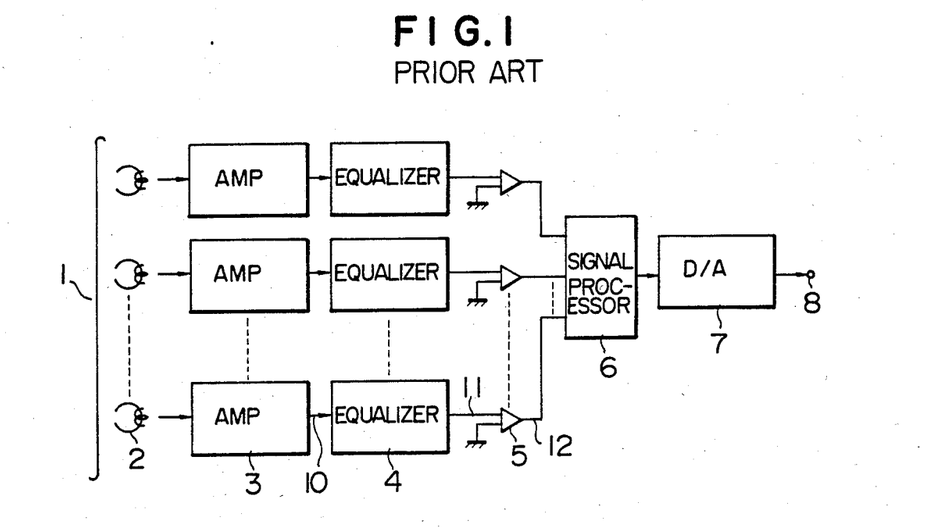
FIG. 1 is a block diagram of a prior art multitrack PCM reproducing apparatus.

FIG. 1 shows the structure of a prior art PCM reproducing apparatus adapted for reproducing PCM signals recorded on a plurality of tracks in a distributed relation. Referring to FIG. 1, PCM signals recorded on a plurality of tracks of a magnetic tape 1 in a distributed fashion are reproduced by associated reproducing heads 2 and then amplified up to a required level by associated amplifier circuits 3. After being subjected to waveform equalization by associated waveform equalizer circuits (analog filters) 4, the PCM signals are converted by associated comparators 5 into digital signals which are applied to a signal processing circuit 6. After being subjected to signal processing including error correction in the signal processing circuit 6, the PCM signals are converted by a D/A converter 7 into analog signals which appear at an audio signal output terminal 8.

Figure 2A:
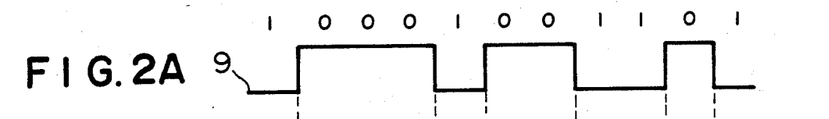
FIGS. 2A to 2D show signal waveforms at principal parts in FIG. 1.
Figure 2B:
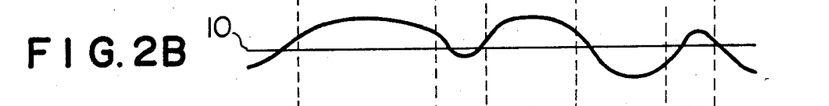
Figures 2C, 2D:
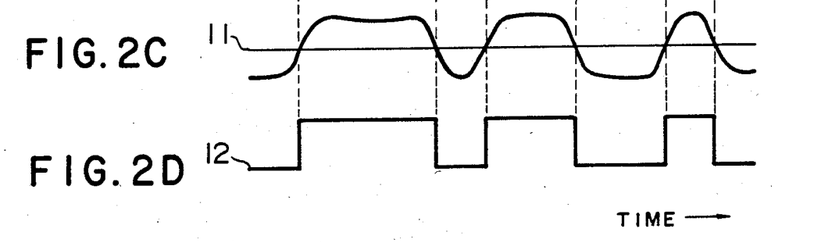

FIGS. 2A to 2D show signal waveforms at various parts in FIG. 1. The signal waveform 9 shown in FIG. 2A represents the original waveform of one of the recorded signals before being reproduced by the associated reproducing head 2 in FIG. 1. FIG. 2B illustrates that the output waveform 10 of the amplifier circuit 3 is degraded due to the transmission characteristics of the magnetic tape and magnetic head. Consequently, when such a waveform 10 is converted by the associated comparator 5 into a digital signal by means of zero-point detection, the resultant waveform will be inevitably different from the waveform of the recorded signal, resulting in a data error. Therefore, the amplifier output waveform 10 shown in FIG. 2B is subjected to waveform equalization by the associated waveform equalizer circuit 4 to obtain an equalized waveform 11 as shown in FIG. 2C, and this equalized waveform 11 is then converted by the comparator 5 into a digital signal waveform 12 which is an accurate reproduction of the recorded signal waveform, as shown in FIG. 2D.

An RC filter or a transversal filter is generally used as the waveform equalizer circuit 4. While the RC filter is advantageous in that the circuit size is small and the required equalization characteristic can be easily achieved, it has such a disadvantage that control of the delay characteristic is very long. For the above reason, the transversal filter is preferred for attaining the desired accurate waveform equalization. However, the circuit size of the transversal filter is large, and a multitrack PCM reproducing apparatus requires as many transversal filters as the number of tracks. Thus, great difficulty is encountered in the integration of such a large-scale analog circuit into an IC.

SUMMARY OF THE INVENTION

It is therefore a primary object of the present invention to provide a multitrack PCM reproducing apparatus including a waveform equalizer circuit suitable to be integrated into an IC.

The multitrack PCM reproducing apparatus according to the present invention functions such that signals reproduced from a plurality of tracks of a magnetic tape are sequentially selected by a signal selector circuit, and, after conversion of the reproduced signals into digital signals by an A/D converter, the waveform of the signals reproduced from the individual tracks is equalized by a single digital filter.

The above and other objects, features and advantages of the present invention will be apparent from the following detailed description taken in conjunction with the accompanying drawings, in which:

DESCRIPTION OF THE PREFERRED EMBODIMENTS

Preferred embodiments of the present invention will now be described in detail with reference to the drawings.

Figure 3:
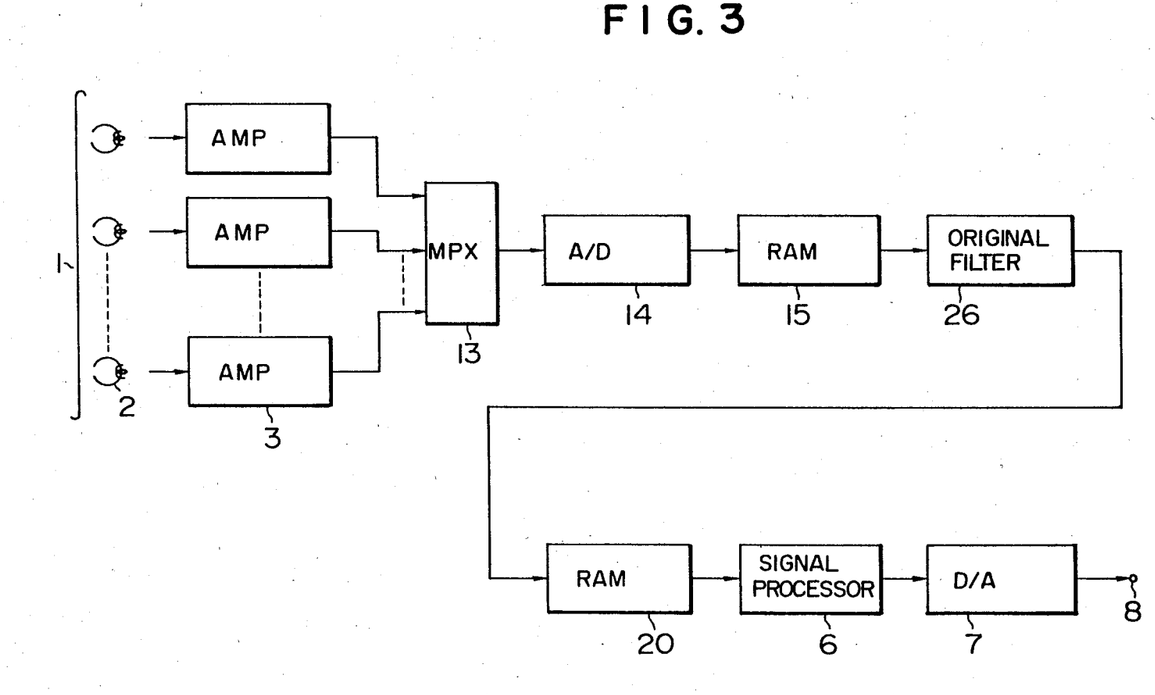
FIG. 3 is a block diagram of a first preferred embodiment of the present invention.
Figure 4A:
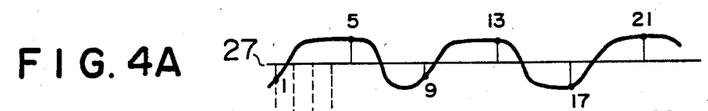
FIGS. 4A to 4D illustrate the timing of A/D conversion in the course of time division multiprocessing according to the present invention.
Figure 4B:
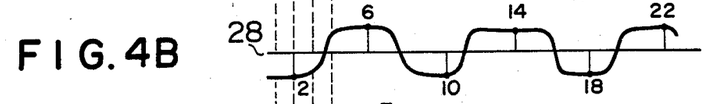
Figure 4C:
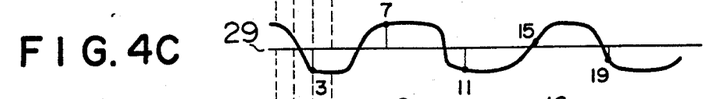
Figure 4D:
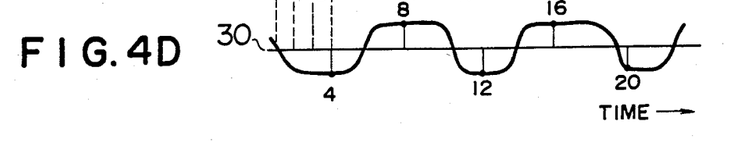

Referring first to FIG. 3 which is a block diagram of a first preferred embodiment of the present invention, the reference numerals 13, 14, 15, 20 and 26 respectively designate a multiplexer (abbreviated hereinafter as an MPX), an A/D converter, a RAM and a digital filter. Other parts in FIG. 3 are designated by the same reference numerals as those appearing in FIG. 1 since they are the same or equivalent parts.

The operation of the first embodiment will now be described in detail. PCM signals recorded on a plurality of tracks of a magnetic tape 1 are simultaneously reproduced by the magnetic heads 2 associated with the tracks respectively. The signals reproduced from the individual tracks are amplified up to a predetermined level by the associated amplifier circuits 3 respectively. The outputs from the amplifier circuits 3 associated with the individual tracks respectively are sequentially selected by the MPX 13 and applied to the A/D converter 14 so that the signal waveforms reproduced from the individual tracks are sequentially converted into digital signals by the A/D converter 14.

The thus A/D converted data are stored temporarily in the RAM 15. The stored data corresponding to the individual tracks are then sequentially read out from the RAM 15 to be subjected to waveform equalization by the digital filter 26. After the waveform equalization, the data are stored in the RAM 20.

The RAM 15 stores the PCM digital signal obtained by the A/D conversion of the waveform 10 shown in FIG. 2B. The RAM 20 stores the waveform-equalized PCM digital data corresponding to the waveform 11 shown in FIG. 2C. On the other hand, the signal processing circuit 6 requires the digital data corresponding to the waveform 12 shown in FIG. 2D. That is, this waveform 12 represents a binary signal of "1's" and "0's". Since the waveform 12 is indicative of the positive and negative portions of the waveform 11 shown in FIG. 2C, a binary signal which is the same as the waveform 12 shown in FIG. 2D can be obtained with only the sign bits of the data stored in the RAM 20 being extracted.

The digital signals applied to the signal processing circuit 6 are subjected to signal processing including error correction and then converted by the D/A converter 7 into analog signals which appear at the audio signal output terminal 8.

It will be seen from the above description that the present invention provides the following advantages:

(1) Data recorded on the plural tracks can be processed by a single circuit system, since the waveforms reproduced from the individual tracks, which are simultaneously reproduced, are selected in a time division mode to be sequentially converted into digital signals and are then subjected to waveform equalization. Therefore, a single digital filter is required unlike the prior art apparatus in which a separate RC filter or traversal filter is required for each track.

(2) The waveform required for processing by the signal processing circuit 6 can be obtained by merely extracting the sign bits of only the data stored in the RAM 20. Therefore, the digital signal required for processing by the signal processing circuit 6 can be obtained without the use of data separation circuits corresponding to the comparators 5 included in the prior art apparatus shown in FIG. 1, thereby simplifying the structure of the apparatus.

The practical operation of the first embodiment of the present invention described above will be described in further detail. FIGS. 4A to 4D illustrate the manner of time division multiprocessing according to the present invention when the magnetic tape 1 has four recording tracks. The waveforms 27 to 30 represent those reproduced simultaneously from the individual tracks respectively, and each of them corresponds to the waveform 10 shown in FIG. 2B. The numerals 1 to 22 indicate the timing of A/D conversion.

The MPX 13 selects the first track at the timings 1, 5, 9, . . . , and the waveform reproduced from the first track is A/D converted by the A/D converter 14. Similarly, the waveform reproduced from the second track is A/D converted at the timings 2, 6, 10, . . . ; the waveform reproduced from the third track is A/D converted at the timings 3, 7, 11, . . . ; and the waveform reproduced from the fourth track is A/D converted at the timings 4, 8, 12, . . . In this manner, the waveforms reproduced from the plural tracks can be converted into the digital signals by the single A/D converter 14.

In this case, the period of sampling the data reproduced from the individual tracks is four times (the number of tracks) the sampling period of the A/D converter 14. Therefore, the sampling period of the A/D converter 14 must be selected to be ¼ of the required sampling period. The A/D converted data are written in the RAM 15 in the sampled order (the order of the numerals shown in FIGS. 4A to 4D).

In the case of waveform equalization in the digital filter 26, the data stored in the RAM 15 are read out, for example, in the order of the first, fifth, ninth, . . . for the first track so that all the waveforms reproduced from the individual tracks can be processed by the single digital filter 26.

Figure 5:
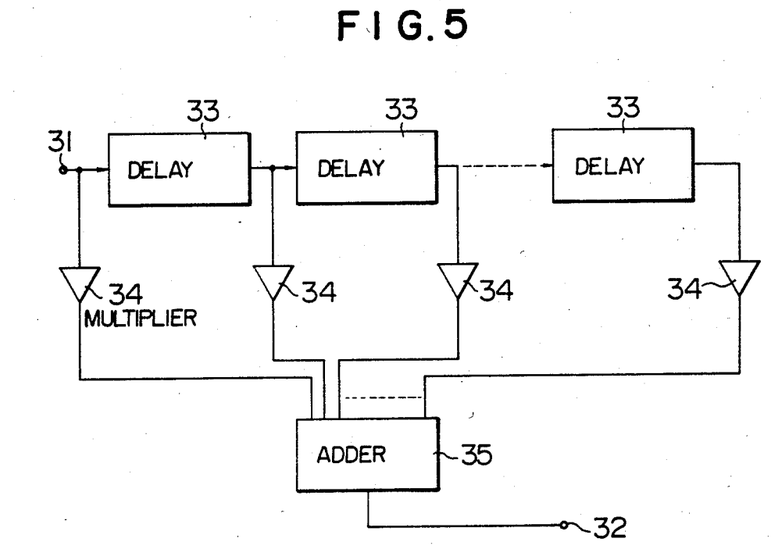
FIG. 5 is a block diagram of an FIR type digital filter which is one known form of the digital filter shown in FIG. 3.

FIG. 5 shows the structure of an FIR (finite impulse response) type digital filter which is one form of the digital filter 26. This FIR type digital filter is commonly known in the art, and, therefore, its structure and operation will be only briefly described herein. In FIG. 5, the reference numerals 31, 32, 33, 34 and 35 respectively designate a data input terminal, a data output terminal, delay circuits, coefficient multiplier circuits and an adder circuit.

In the digital filter having such a structure, data applied to the data input terminal 31 are successively delayed by the delay circuits 33. The delayed data are multiplied by predetermined coefficients in the coefficient multiplier circuits 34 and are then summed up in the adder circuit 35.

Figure 6:
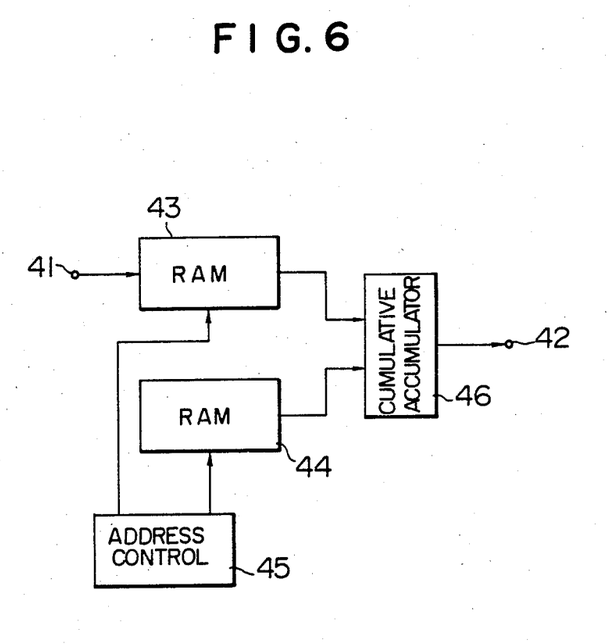
FIG. 6 is a block diagram of another known form of the digital filter shown in FIG. 3.

FIG. 6 shows the practical structure of another form of the FIR type digital filter including RAM's and a cumulative multiplier. In FIG. 6, the reference numerals 41, 42, 43, 44, 45 and 46 respectively designate a data input terminal, a data output terminal, a RAM temporarily storing data, a RAM (or a ROM) storing coefficients, an address control circuit, and a cumulative accumulator. In the FIR type digital filter shown in FIG. 6, data written in the RAM 43 are sequentially read out with a predetermined delay time to delay the data.

In the data processing by the FIR type digital filter having such a structure, input data are sequentially written in the RAM 43. The data written in previously, that is, delayed data are sequentially read out from the RAM 43 between one write timing and the next write timing, and, in the cumulative accumulator 46, the individual data read out from the RAM 43 are accumulated respectively by the coefficients stored in the RAM (ROM) 44 to obtain the sum of the results of multiplication. Thus, the circuit shown in FIG. 6 can attain the same manner of processing as that carried out by the circuit shown in FIG. 5, and its circuit size is smaller than that shown in FIG. 5.

The coefficients stored in the RAM (ROM) 44 determine the equalization characteristic of the digital filter. When the optimum equalization characteristic is known, the corresponding coefficients may be written in the ROM 43. However, in view of variations of the transmission characteristics of the magnetic heads, tape, etc., it is preferable for the purpose of minimizing data errors during reproduction to determine the equalization characteristic depending on a specific recorder or a magnetic tape. To meet the above requirement, it is preferable to store the coefficients in the RAM 43 and to suitably change the coefficients depending on the state of reproduction, so that the digital filter can function as an automatic equalizer.

Figure 7:
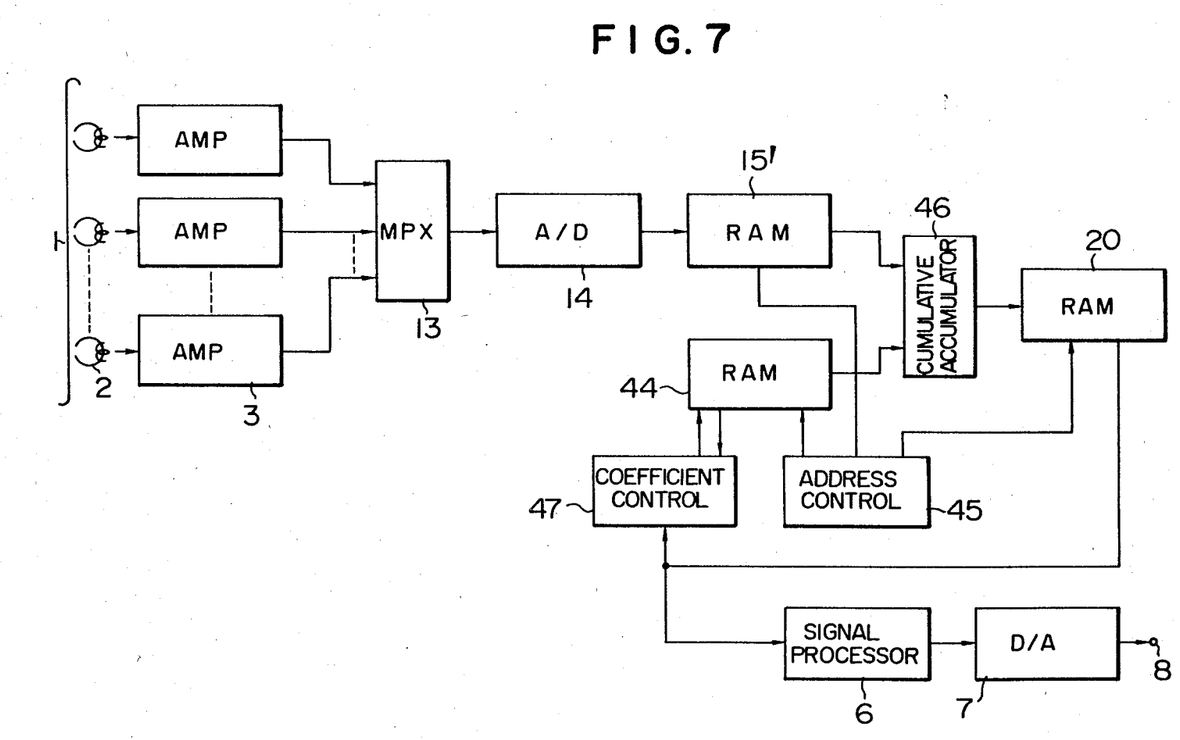
FIG. 7 is a block diagram of a second preferred embodiment of the present invention.

FIG. 7 shows a second embodiment of the present invention including a digital filter capable of automatic waveform equalization. In FIG. 7, the reference numeral 47 designates a coefficient control circuit provided for effecting the automatic waveform equalization, and the same reference numerals are used to designate the same or equivalent parts appearing in FIGS. 3 and 6. A RAM 15' shown in FIG. 7 has both of the function of the RAM 15 shown in FIG. 3 and the function of the RAM 43 shown in FIG. 6. The RAM's 15' and 44, coefficient control circuit 47, address control circuit 45 and cumulative accumulator 46 constitute a digital filter.

Figure 8:
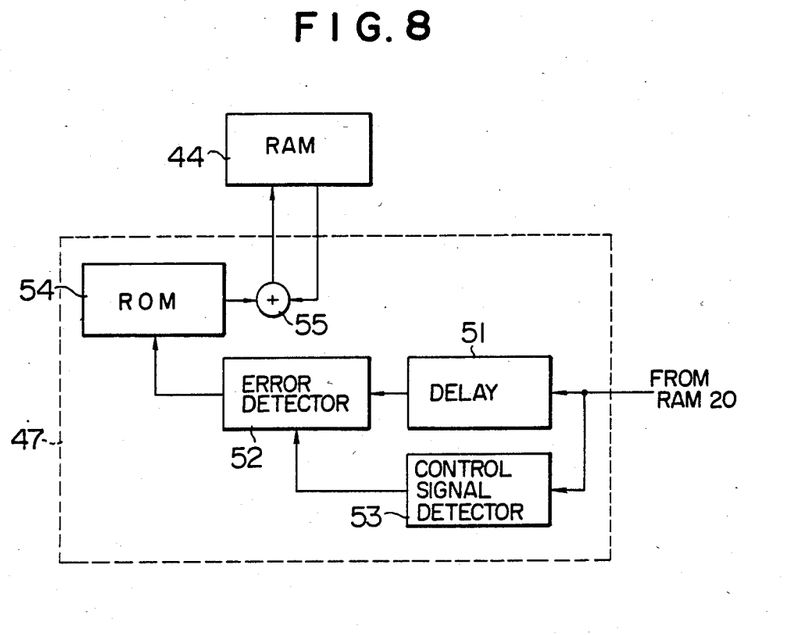
FIG. 8 is a block diagram showing in detail the structure of the coefficient control circuit shown in FIG. 7.

FIG. 8 shows the practical structure of one form of the coefficient control circuit 47 shown in FIG. 7. In FIG. 8, the reference numerals 51, 52, 53, 54 and respectively designate a delay circuit, an error detection circuit, a control signal detection circuit, an ROM, and an adder circuit.

Before describing the operation of the second embodiment shown in FIG. 7, the method of automatic waveform equalization will be described. The method of zeroforcing is commonly employed or representative of the method of automatic waveform equalization.

Figure 9:
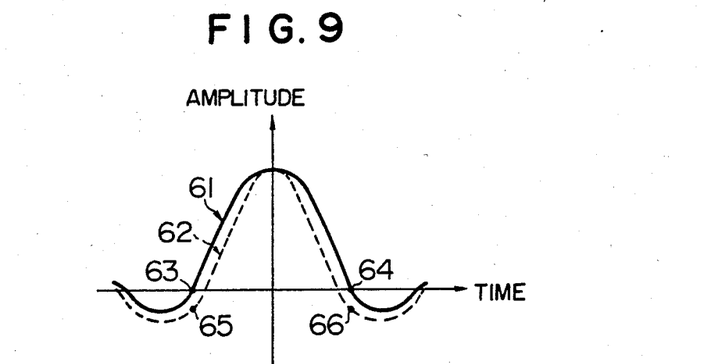
FIG. 9 shows the waveform of a response pulse which is a reproduction of an isolated pulse.

FIG. 9 shows the waveform of a response pulse which is a reproduction of an isolated pulse. In FIG. 9, the solid curve 61 represents a reproduced pulse waveform when the waveform is ideally equalized, while the dotted curve 62 represents a reproduced pulse waveform when the waveform is not sufficiently equalized. A method for finding the optimum equalization characteristic is known in which the equalization characteristic is so adjusted that the points 63 and 64 of zero amplitude are as close to the ideal condition as possible thereby minimizing the total error. Therefore, for the purpose of automatic waveform equalization, it is preferable to detect the amplitude values at points 65 and 66 on the actual reproduced waveform 62 corresponding to the zero-amplitude points 63 and 64 on the ideal reproduced waveform and to adjust the equalization characteristic so that the detected amplitudes become as close to zero as possible.

The operation of the second embodiment having the aforementioned structure will now be described.

At the recording starting time or at a suitable time during recording (for example, at a time of absence of any signal), a test-purpose isolated pulse and a control signal indicative of a test signal are recorded on a magnetic tape 1. This control signal which is a 4-bit signal of, for example, "1101" is recorded on the magnetic tape 1 prior to recording of the isolated pulse, and, after recording of the control signal, the isolated pulse is recorded with a delay corresponding to, for example, 20 bits. Then, PCM signals are recorded on the magnetic tape 1.

Prior to the reproduction starting time, the standard equalization characteristic is loaded in the RAM 44 from the ROM 54 shown in FIG. 8. In this case, the RAM 44 is first cleared, and the values which are the sums of the values of the coefficients corresponding to the standard equalization characteristic stored in the ROM 54 and the value stored in the RAM 44 (which value is "0" because the RAM 44 is cleared) are written in the RAM 44 from the adder circuit 55.

Then, the magnetic tape 1 is played back to reproduce by the magnetic heads 2 the control signal and isolated pulse recorded on the magnetic tape 1. The reproduced control signal and isolated pulse are applied to the RAM 15' through the amplifier circuits 3, MPX 13 and A/D converter 14. The control signal and isolated pulse read out from the RAM 15' are multiplied in the cumulative accumulator 46 by the values of the coefficients corresponding to the standard equalization characteristic loaded in the RAM 44 and are then stored in the RAM 20.

The control signal and isolated pulse stored in the ROM 20 are then read out to be applied to the delay circuit 51 and control signal detection circuit 53 in the coefficient control circuit 47. The control signal detection circuit 47, which is composed of, for example, a shift register and a counter, detects the control signal when the input is "1101". On the basis of the detected control signal, the control signal detection circuit 53 detects then the isolated pulse recorded by 20 bits later than the control signal, and the error detection circuit 52 detects errors at the points 65 and 66 in FIG. 9. The delay circuit 51 acts to delay the input data by the length of time required for detection of the isolated pulse after detection of the control signal. In this embodiment, the delay circuit 51 is a 20-bit delay circuit.

The ROM 54 stores various values for correcting the coefficients depending on the detected errors, so that the coefficient correction value corresponding to the errors detected by the error detection circuit 52 can be selected. Then, the coefficients stored in the RAM 44 are corrected by the function of the adder circuit 55.

In this manner, the coefficients are determined depending on the magnetic heads, tape, tape recorder, etc., and such coefficients are used for the waveform equalization of the reproduced signals. The operation of the second embodiment in the playback mode is the same as that of the first embodiment, and any detailed description thereof is unnecessary.

It will be apparent from the above description of the second embodiment that determination of the equalization characteristic to meet a specific magnetic tape and a specific tape recorder can minimize data errors during reproduction.

Figure 10:
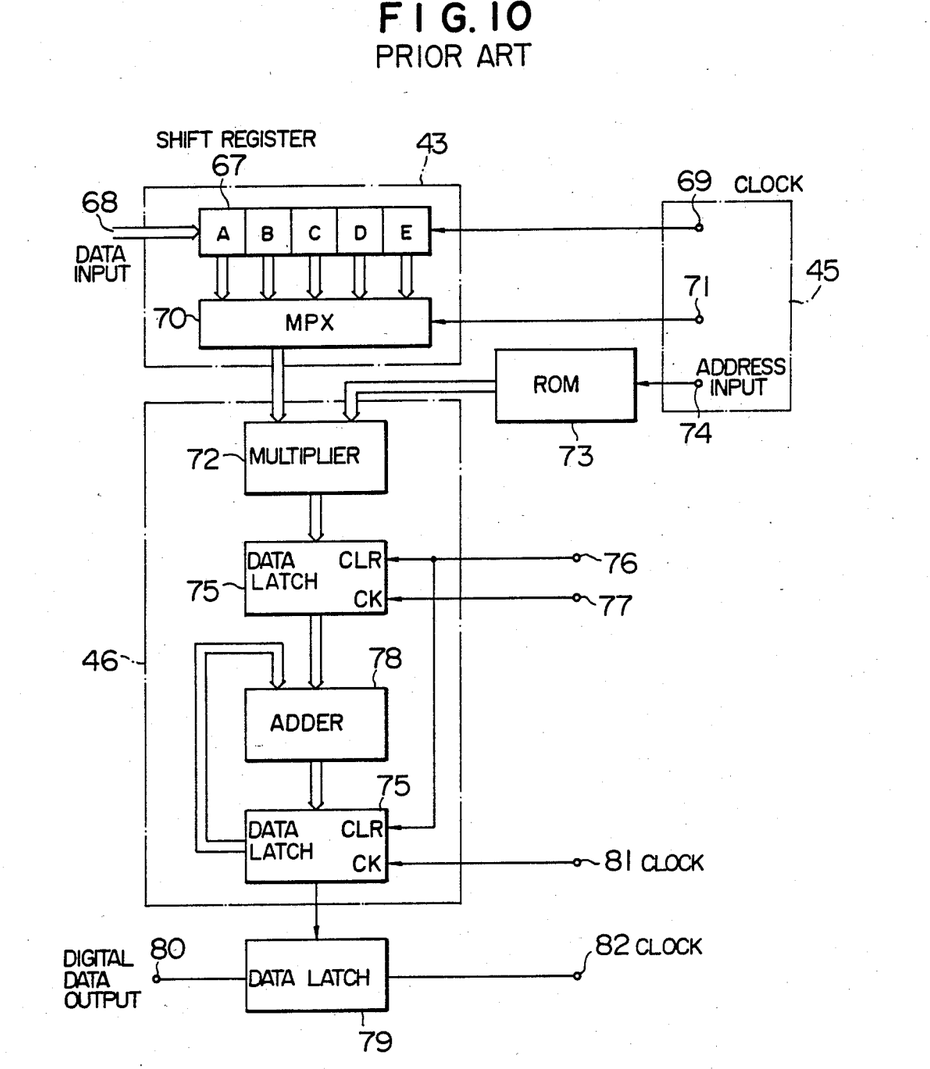
FIG. 10 is a block diagram of another known form of the FIR type digital filter using a shift register.

As another form of the FIR type digital filter, a prior art circuit adapted for sampling data at five points is shown in FIG. 10. The operation of the circuit shown in FIG. 10 will be described with reference to FIGS. 11A, 11B and 12.

Figure 11A:
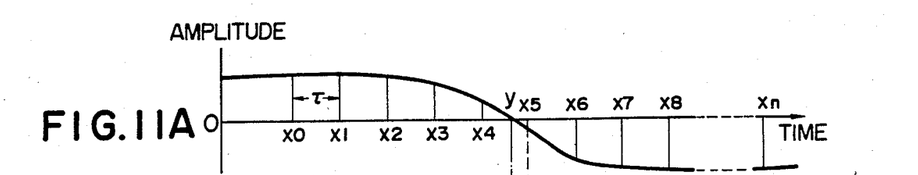
FIGS. 11A and 11B are a waveform diagram illustrating the operation of the digital filter shown in FIG. 10.
Figure 12:
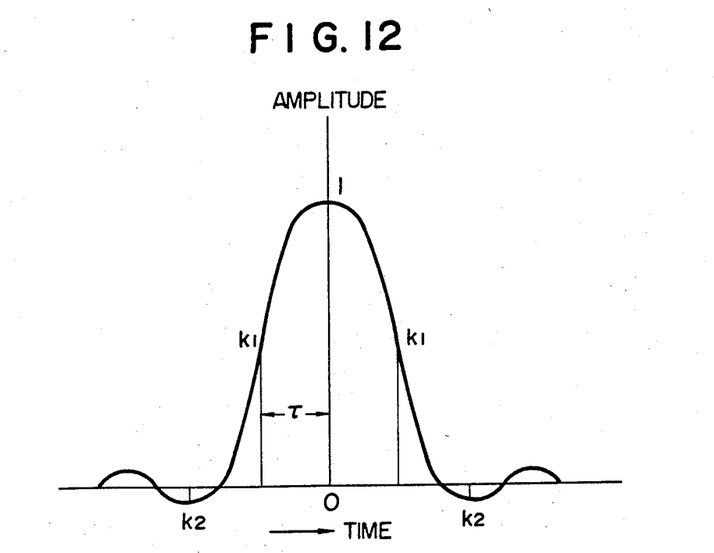
FIG. 12 shows an example of impulse response data used for correction of the frequency characteristic by the FIR type digital filter shown in FIG. 10.

Data obtained by A/D conversion of distorted digital data as, for example, shown in FIG. 11A are applied through a data input terminal 68 to a shift register 67 including a plurality of stages A, B, C, D and E. Then, the data registered in the individual stages E, D, C, B and A of the shift register 67 are selected by a multiplexer 70 to be respectively multiplied in a multiplier 72 by impulse response data $k_2$, $k_1$, 1, $k_1$ and $k_2$ stored in an ROM 73 and shown in FIG. 12.

The data thus multiplied are added in an adder 78 so that the frequency characteristic at the timing corresponding to the data registered in the stage C of the shift register 67 can be corrected. In this case, the frequency characteristic can be corrected as desired by changing the data stored in the ROM 73, as commonly known in the art.

Since the corrected data appear as a digital signal, its sign bit tells the change point of data from positive to negative or from negative to positive.

Suppose, for example, that the data are as shown in FIG. 11A, and the output appears from the FIR type digital filter at points $x_0$, $x_1$, $x_2$, . . . , $x_n$ respectively. In such a case, a positive-to-negative change occurs between the points $x_4$ and $x_5$ as seen in FIG. 11A, and a signal indicative of the positive-to-negative change is applied to a third data latch 79 from a second data latch 75 connected to the output of the adder 78, and, in response to a data latch signal applied to a data latch signal input terminal 82, required digital data are latched in the data latch 79 to appear from its data output terminal 80.

Figure 11B:
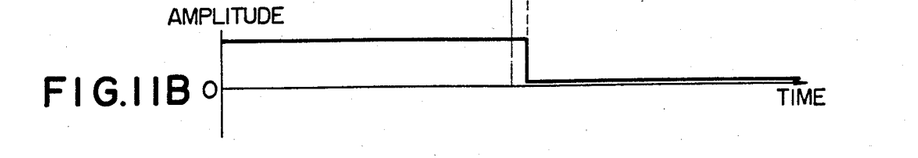

In the case of the prior art digital filter shown in FIG. 10, the point $x_5$ is decided to be the change point or zero-crossing point depending on the sampling timing although the point y is the true zero-cross point or change point. Thus, the data will be judged to be inverted at a point different from the original data change point, thereby to output the signal as shown in FIG. 11(b) from the data output terminal 80. In other words, the reproduced digital signal deviates from the original digital signal in the rising or falling timing, as seen in FIGS. 11A and 11B.

Such an undesirable deviation can be avoided by shortening the sampling interval $\tau$ thereby more accurately detecting the change point. On the other hand, however, the increase in the sampling points for computation leads to the problem that the processing speed of the digital filter cannot match the increased sampling points.

Figure 13:
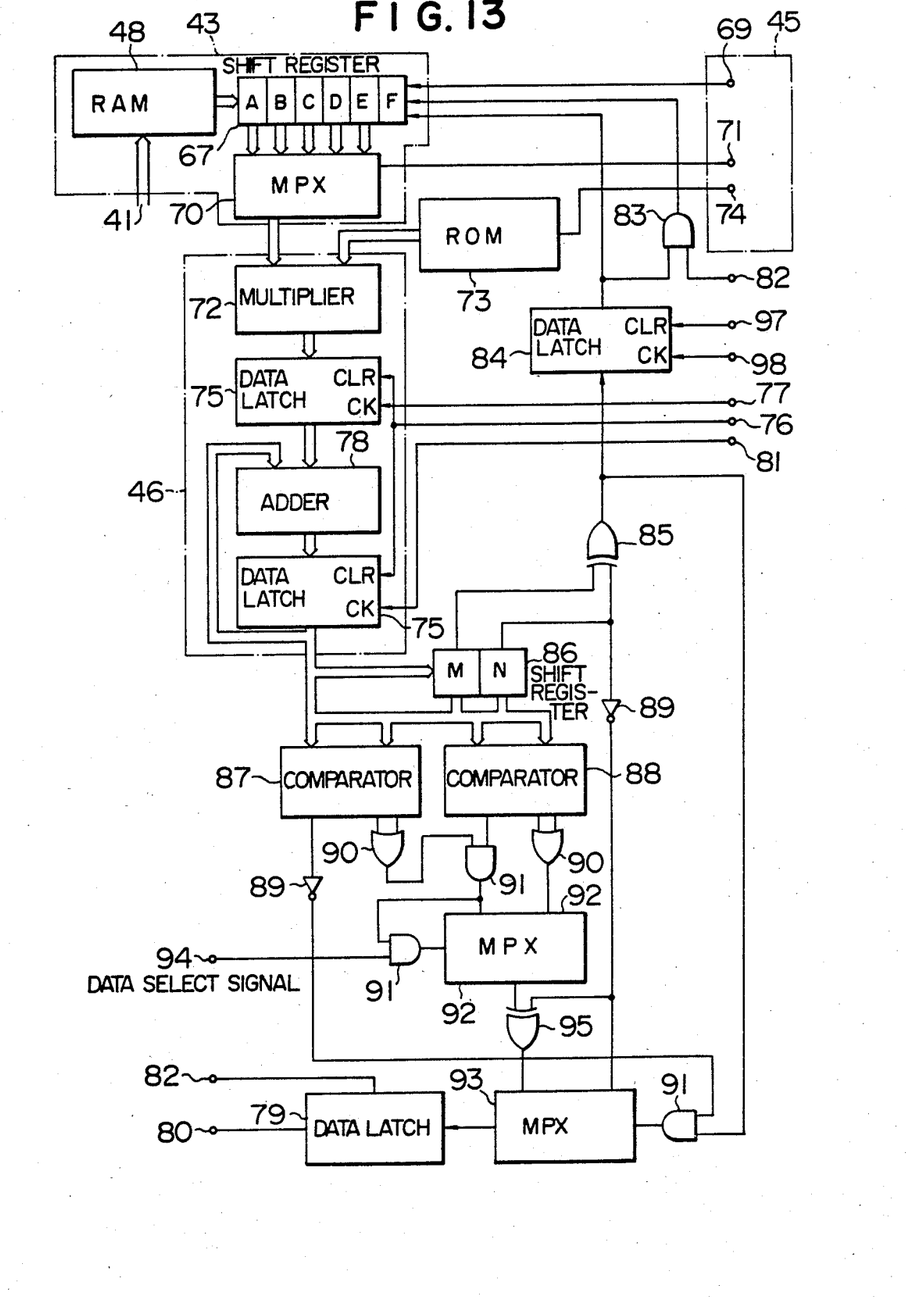
FIG. 13 is a block diagram of another form of the digital filter preferably employed in the present invention.

FIG. 13 shows the structure of a circuit provided according to the present invention to solve the above problem. Referring to FIG. 13, an RAM 48, AND gates 83, 91, a data latch 84, exclusive-OR gates (referred to hereinafter as EXOR gates) 85, 95, a shift register 86, comparators 87, 88, an inverter 89, an OR gate 90, multiplexers 92, 93, a data select signal input terminal 94, a reverse shift signal input terminal 96, a data latch clear signal input terminal 97 and a data latch clock input terminal 98, are added to the circuit shown in FIG. 10.

In the circuit shown in FIG. 13, the function of the FIR type digital filter composed by the elements designated by the reference numerals 67 to 78 is the same as that shown in FIG. 10. However, it will be noted that the shift register 67 in FIG. 13 includes stages A, B, C, D, E and F, meaning that it includes an additional stage F.

Referring to FIG. 13, the data obtained by the sampling at points $x_1$ to $x_n$ and by the succeeding A/D conversion of the distorted digital data shown in FIG. 11A are stored temporarily in the RAM 48 before being applied to the shift register 67.

Suppose now that the data sampled at the points $x_0$, $x_1$, $x_2$, $x_3$ and $x_4$ in FIG. 11A are registered in the stages E, D, C, B and A respectively of the shift register 67. Then, the data which has been sampled at the point $x_2$ in FIG. 11A and for which the frequency characteristic has been corrected in the FIR type digital filter in the manner described with reference to FIG. 10, is registered in the stage M of the shift register 86.

In the form shown in FIG. 13, the data sampled at the points $x_1$, $x_2$, $x_3$, $x_4$, $x_5$ and $x_6$ in FIG. 11A are then registered in the stages F, E, D, C, B and A respectively of the shift register 67 as a result of a two-stage shift.

Therefore, the data sampled at the point $x_4$ in FIG. 11A is now processed for the correction of the frequency characteristic and is then registered in the stage M of the shift register 86, and the data sampled at the point $x_2$ and registered previously in the stage M of the shift register 86 is now shifted to the stage N.

When the values of the data registered in the stages M and N respectively of the shift register 86 are both positive or negative, the data "1" or "0" are applied to the data latch 79 through the multiplexers 92 and 93.

Since, in this case, the values of the data registered in the respective stages M and N of the shift register 86 are both positive, the data "1" are latched in the data latch 79 through the multiplexers 92 and 93 to appear at the data output terminal 80 with the timings of the sampling points $x_2$ and $x_3$ in FIG. 11A.

Suppose similarly that the data sampled at the points $x_6$ and $x_4$ in FIG. 11A (both of which have been corrected in the frequency characteristic by the aforementioned manner of signal processing) are registered now in the stages M and N respectively of the shift register 86. In such a case, the values of the data sampled at the points $x_6$ and $x_4$ are positive and negative respectively. This means that the data change point or zero-crossing point exists between the two sampling points $x_6$ and $x_4$.

The data sampled at the point $x_4$ is now registered in the state N of the shift register 86, and a signal indicative of the presence of the change point is generated from the EXOR gate 85. This signal is latched temporarily in the data latch 84 and is used to make a reverse onestage shift of the shift register 67, so that the data sampled at the point $x_5$ is now processed for correction of the frequency characteristic.

Then, the comparator 87 compares the data sampled at the points $x_4$ and $x_5$ to find the one having a smaller absolute value, and the data sampled at the timing providing the smaller absolute value passes through the multiplexer 92. The data passes then through the EXOR gate 95 and through the multiplexer 93 to be latched in the data latch 79 and appears finally at the data output terminal 80.

Since, in this case, the data sampled at the point $x_5$ has an absolute value smaller than that of the data sampled at the point $x_4$, the data turning into "0" at the timing of the sampling point $x_5$ appears at the data output terminal 80. Finally, the output of the data latch 79 is applied through the AND gate 83 to the shift register 67 to shift the shift register 67 by one stage in the normal direction to restore it to the original state. Similar operation is repeated thereafter.

It will be apparent from the above description given with reference to FIG. 13 that data sampled at alternate points are subjected to corrective processing while no change occurs in the sign of the data, so that the number of processing operations of the FIR type digital filter can be reduced to one-half that required hitherto. According to the present invention, only when a change point is detected, that is, only when an inversion of the sign of data is detected, data sampled at points including the point of sampling effected immediately before such an inversion are processed, so that the data can be inverted with the timing which is as close to the change point as possible.

According to the present invention, the number of processing operations of the FIR type digital filter is smaller than that of the prior art one shown in FIG. 10, and the corresponding margin can be provided in the processing time of the digital filter, even when the sampling interval $\tau$ may be shortened so as to invert data at a point closest possible to the actual change point of received data. According to the present invention, therefore, the sampling interval $\tau$ can be further shortened, and data can be inverted at a point closest possible to the actual change point of received data.

Although an FIR type digital filter is used as the digital frequency correction circuit in the present invention by way of example, it is apparent that any other suitable digital filter can be similarly effectively used.

It will be understood from the foregoing detailed description of the present invention that a single digital filter is only required for reproduction because data recorded on a multitrack magnetic tape can be processed by a single circuit system. Therefore, the present invention can provide a multitrack reproducing apparatus including a digital filter suitable to be integrated into an IC. Further, a digital filter which can detect zero-cross points of a digital signal itself with high accuracy can be conveniently used for providing more accurate digital data.

We claim:

1. A multitrack PCM reproduced apparatus adapted for reproducing PCM signals recorded on a plurality of tracks in a distributed relation, comprising a signal selector means for sequentially selecting the PCM signals reproduced from the individual tracks, an A/D converter for converting the reproduced signals selected by said signal selector means into digital signals, a memory for storing the digital signals obtained by the A/D conversion, a single digital filter for equalizing for each track the waveform of the digital signals stored in said memory, a PCM demodulator for demodulating the PCM signals on the basis of the digital signals processed by said digital filter, and wherein said digital filter includes a coefficient memory for storing a plurality of predetermined coefficients, a control means for sequentially sampling the plural coefficients stored in said coefficient memory and the output of said memory for storing the digital signals according to a predetermined order, a means for multiplying the sampled digital signals by the coefficients and computing the sum of the plural products, and a coefficient control means for varying the coefficients stored in said coefficient memory to render the demodulated PCM signals to be optimum.

2. A multitrack PCM reproducing apparatus as claimed in claim 1, further comprising a second memory connected between said digital filter and said PCM signal demodulating circuit for storing the digital signals applied from said digital filter.

3. A multitrack PCM reproducing apparatus as claimed in claim 1, wherein said coefficient control means detects, in response to the application of a control signal and an isolated pulse recorded prior to recording of the PCM signals, the actual reproduced amplitude value of the isolated pulse corresponding to the zero amplitude of the recorded isolated pulse, and said detected amplitude value is supplied to said coefficient memory to be adjusted to zero.

4. A multitrack PCM reproducing apparatus as claimed in claim 3, wherein said coefficient control means includes a control signal detector means for detecting said control signal, a delay means for delaying the input data by the length of time corresponding to the time interval between said control signal and the position of said detected amplitude value of said isolated pulse, and an error detector means for detecting the error of said detected amplitude value on the basis of the outputs from said delay means and said control signal detector means.

5. A multitrack PCM reproduced apparatus adapted for reproducing PCM signals recorded on a plurality of tracks in a distributed relation, comprising a signal selector means for sequentially selecting the PCM signals reproduced from the individual tracks, an A/D converter for converting the reproduced signals selected by said signal selector means into digital signals, a memory for storing the digital signals obtained by the A/D conversion, a single digital filter for equalizing for each track the waveform of the digital signals stored in said memory, a PCM demodulator for demodulating the PCM signals on the basis of the digital signals processed by said digital filter, and wherein said digital filter includes a coefficient memory for storing a plurality of predetermined coefficients, a control means for sequentially sampling the plural coefficients stored in said coefficient memory and the output of said memory for storing the digital signals according to a predetermined order, a means for multiplying the sampled digital signals by the coefficients and computing the sum of the plural products, a second memory connected to said means for multiplying and computing for storing a first and a second amplitude value sampled at two points spaced apart by at least one sampling period, a detection means for comparing said first and second amplitude values and, when said two amplitude values having different polarities, detecting the different polarities, first means applying the output of said detection means to said first memory so that an amplitude value at a sampling point intermediate between said two sampling points can be detected, and second means connected to said second memory for comparing the absolute values of said first and second amplitudes to generate an output indicative of the smaller value.

6. A multitrack PCM reproducing apparatus comprising, means for simultaneously reproducing PCM signals recorded on a plurality of tracks in a distributed relation, a signal selector means for sequentially selecting the PCM signals reproduced from the individual tracks, an A/D converter for converting the reproduced signals selected by said signal selector means into digital signals, a memory for storing the digital signals obtained by A/D conversion, a single digital filter for equalizing for each track the waveform of the digital signal stored in said memory and a demodulator for demodulating the PCM signals on the basis of the digital signals processed by said digital filter, said single digital filter including a coefficient memory for storing a plurality of predetermined coefficients, a control means for sequentially sampling the plural coefficients stored in said coefficient memory and the output of said memory for storing the digital signals according to a predetermined order, and a means for multiplying the sampled digital signals by the coefficients and computing the sum of the plural products.

7. A multitrack PCM reproducing apparatus as claimed in claim 6 further comprising a second memory coupled between said digital filter and said demodulator.

* * * * *